United States Patent [19]

Yamada et al.

[11] Patent Number: 4,719,034

[45] Date of Patent: Jan. 12, 1988

[54] SOLID SILICONE DEFOAMING AGENT AND METHOD FOR ITS PRODUCTION

[75] Inventors: Takateru Yamada; Keiichi Kishimoto, both of Chiba, Japan

[73] Assignee: Toray Silicone Co., Ltd., Tokyo, Japan

[21] Appl. No.: 801,449

[22] Filed: Nov. 25, 1985

[30] Foreign Application Priority Data

Dec. 5, 1984 [JP] Japan ................. 59-256746

[51] Int. Cl.$^4$ ............................................. B01D 19/04
[52] U.S. Cl. ........................... 252/358; 252/321; 210/750
[58] Field of Search ........... 252/358, 321; 210/750

[56] References Cited

U.S. PATENT DOCUMENTS

| | | | |
|---|---|---|---|
| 4,145,308 | 3/1979 | Simoneau | 252/321 |
| 4,194,988 | 3/1980 | Shneider | 252/312 |
| 4,225,456 | 9/1980 | Schmidt | 252/321 |
| 4,274,977 | 6/1981 | Koerner | 252/358 |
| 4,313,917 | 2/1982 | Ohta | 423/228 |
| 4,395,352 | 7/1983 | Kulkari | 252/358 |
| 4,396,524 | 8/1983 | Hempel | 252/174.15 |
| 4,406,817 | 9/1983 | Muller | 252/358 |
| 4,443,359 | 4/1984 | Shimizu | 252/358 |
| 4,584,125 | 4/1986 | Griswold | 252/358 |

FOREIGN PATENT DOCUMENTS

| | | |
|---|---|---|
| 712127 | 6/1965 | Canada . |
| 40-1367 | 1/1965 | Japan . |
| 51-20787 | 2/1976 | Japan . |
| 57-171405 | 10/1982 | Japan . |

*Primary Examiner*—John F. Terapane
*Assistant Examiner*—Catherine S. Kilby
*Attorney, Agent, or Firm*—Alexander Weitz

[57] ABSTRACT

A solid defoaming composition, and a process for making the composition, is described. The defoaming composition comprises a solid nonionic surfactant, selected from aliphatic esters of glycerol and propylene glycol; a solid, water-soluble polymer, selected from carboxyvinyl polymers and poly(vinyl alcohol)s; and a silicone composition, composed of a fine silica powder and a silicone oil having a viscosity of at least 100 cS at 25° C. A molded cake of the composition of this invention does not bleed silicone oil and may be employed to defoam aqueous systems for extended periods without the need to replenish the active ingredient. The composition is particularly useful for defoaming septic tanks and sewage.

9 Claims, No Drawings

SOLID SILICONE DEFOAMING AGENT AND METHOD FOR ITS PRODUCTION

The present invention describes a solid silicone defoaming agent and a method for producing said solid silicone defoaming agent.

BACKGROUND OF THE INVENTION

Prior art silicone defoaming agents have various properties, such as a high defoaming effect on aqueous and nonaqueous foaming materials, even when added in small amounts and chemical inertness and they are colorless, transparent and odorless and do not adversely affect the pharmaceutical or chemical product. As a result, they are widely used for defoaming and foam inhibition.

A poly(dimethylsiloxane) oil, as such, or a compound-type defoaming agent comprising fine powdery silica dispersed in poly(dimethylsiloxane) oil, is generally used for defoaming or foam inhibition in nonaqueous systems based on the above properties. An emulsion-type defoaming agent, in which the above-mentioned compound is emulsified with an appropriate emulsifier or emulsification assistant, is used for defoaming or foam inhibition in aqueous systems. In addition, powdery defoaming agents have been proposed in which the compound or poly(dimethyliloxane) oil mentioned above is taken up into calcium carbonate, magnesium carbonate, cork powder, etc. (Japanese Patent No. 40-1367 [No.65-1367] and Japanese Kokai Patents No. 51-20787 [No. 76-20787] and 57-171405 [No. 82-171405]).

The emulsion types, which are applied in aqueous systems, suffer from the following drawbacks. (1) The ability of the emulsion deteriorates due to changes in temperature, due to vibrations during transport as well as due simply to long-term storage with the result that the emulsion system is broken. (2) They are subject to spoilage and mildew, unless combined with the appropriate preservative or antimold. (3) They require a device such as a measuring pump, or require manual labor when added to the foaming system. The prior art powdery defoaming agents exhibit the following drawbacks in practical application. (4) The oil exudes with time and (5) manual labor is required for addition to the foaming system.

The present invention describes a solid silicone defoaming agent which does not suffer from the above-described drawbacks and the present invention also describes a method for producing said solid silicone defoaming agent.

With the installation of the solid silicone defoaming agent of the present invention, human intervention is not required for at least several days and the immediate and long-term effects are excellent.

In addition, the method of the present invention reliably produces a solid silicone defoaming agent which does not bleed while having the excellent properties mentioned above.

The solid silicone defoaming agent of the present invention is extremely useful for defoaming such foaming systems as septic tanks and sewage.

SUMMARY OF THE INVENTION

The preceding goal is accomplished by a solid silicone defoaming composition consisting essentially of:

(a) 20 to 80 weight % nonionic surfactant selected from the group consisting of glycerol aliphatic acid esters which are solid at room temperature and propylene glycol aliphatic acid esters which are solid at room temperature;

(b) 5 to 50 weight % water-soluble polymer compound selected from the group consisting of carboxyvinyl polymers which are solid at room temperature and a poly(vinyl alcohol) which is solid at room temperature; and (c) 5 to 50 weight % silicone composition of 1 to 20 weight % fine powdery silica and 99 to 80 weight % silicone oil having a viscosity of at least 100 cS at 25° C.

The preceding goal is also accomplished by a method for producing a solid silicone defoaming agent, comprising:

(a) melting 20 to 80% by weight of a nonionic surfactant selected from the group consisting of glycerol aliphatic acid esters which are solids at room temperature and propylene glycol aliphatic acid esters which are solids at room temperature;

(b) mixing said nonionic surfactant, in the molten state, with 5 to 50% by weight of a water-soluble polymer selected from the group consisting of carboxyvinyl polymers which are solid at room temperature and a poly(vinyl alcohol) which is solid at room temperature, to obtain a homogeneous liquid, which is then cooled to 55° to 65° C.;

(c) mixing said homogeneous liquid with 5 to 50% by weight of a silicone composition which contains 1 to 20% by weight fine powdery silica and 99 to 80% by weight silicone oil having a viscosity of at least 100 cS at 25° C.; and (d) pouring the mixture resulting from step (c) into a mold and cooling.

DETAILED DESCRIPTION OF THE INVENTION

The nonionic surfactant (a), selected from among glycerol aliphatic acid esters which are solid at room temperature and propylene glycol aliphatic acid esters which are solid at room temperature, provides for the uniform dispersion of the silicone composition comprising component (c) as the solid silicone defoaming agent gradually dissolves in water. The dispersing effect increases the defoaming performance while the hydrophilic and lipophilic functions of the surfactant simultaneously maintain a long-lasting and uniform dispersion of the silicone composition so the defoaming effect, or foam inhibition effect, will continue for a long period of time.

The glycerol aliphatic acid ester, which is solid at room temperature, may be the monoester, diester or triester. The aliphatic acid constituting the ester may be a saturated or unsaturated aliphatic acid and, in particular, higher saturated aliphatic acids such as myristic and stearic acid are preferred. Concrete examples of the glycerol aliphatic acid esters are glyceryl monostearate, glyceryl monooleate, glyceryl monomyristate, glyceryl distearate and glyceryl dioleate.

The propylene glycol aliphatic acid ester, which is solid at room temperature, may be the monoester or diester and the aliphatic acid constituting the ester is a saturated or unsaturated aliphatic acid. In particular, higher aliphatic acids such as myristic and stearic acid are preferred. The monoesters of higher aliphatic acids are generally the most preferred. Concrete examples are propylene glycol monostearate, propylene glycol monooleate and propylene glycol monopalmitate. These esters must be solid at room temperature. The form of the solid includes granules and powders. One species, or a mixture of two or more species, may be used as the nonionic surfactant. When less than 20 wt % of the nonionic surfactant is blended, it will not have an adequate activity as a solidifying agent. When this quantity exceeds 80 wt %, the defoaming effect is unsatisfactory. Due to this, the blending quantity of nonionic surfactant is 20 to 80 wt % and preferably 35 to 65 wt % based on the combined quantities of components (a) through (c).

Water-soluble polymer compound (b), selected from among carboxyvinyl polymers and poly(vinyl alcohol), regulates the rate of gradual dissolution of the solid defoaming agent into water. The carboxyvinyl polymer is a polymer of carboxyl group-substituted vinyl monomer and it may be a homopolymer or copolymer. Concrete examples of this carboxyvinyl polymer are poly(methacrylic acid), acrylic acid-methacrylic acid copolymers, copolymers of acrylic acid with a small quantity of ethylene and copolymers of acrylic acid with a small quantity of vinyl alcohol. The poly(vinyl alcohol) is a straight-chain polymer of vinyl alcohol and is generally produced by the hydrolysis of poly(vinyl acetate). Small quantities of vinyl acetate units may remain. The carboxyvinyl polymer alone accelerates the dissolution rate of the solid defoaming agent while the poly(vinyl alcohol) alone decelerates the dissolution rate, and the dissolution rate can then be appropriately adjusted by the appropriate selection of the carboxyvinyl polymer/poly(vinyl alcohol) mixing ratio. When less than 5 wt % of the water-soluble polymer is blended, the water solubility of the solid defoaming agent is inadequate. When this quantity exceeds 50 wt %, the water solubility of the solid defoaming agent is too high. Due to this, the water-soluble polymer is blended at 5 to 50 wt %, and preferably 15 to 35 wt %, based on the combined quantities of components (a) through (c).

The silicone composition (c), which is composed of 1 to 20 wt % fine powdery silica and 99 to 80 wt % silicone oil with a viscosity of at least 100 cS at 25° C., has defoaming and foam inhibition activities. Examples of the fine powdery silica are precipitated silica, fumed silica and silica aerogel and examples of the silicone oil are poly(dimethylsiloxane) oil, poly(methylphenylsiloxane) oil and poly(methyl(long-chain alkyl)siloxane) oil. The silicone oils must have viscosities of $\geq 100$ cS at 25° C. because the defoaming performance is low when this viscosity is <100 cS at 25° C. The fine powdery silica may be a mixture of 2 or more silicas and the silicone oil may be a mixture of 2 or more silicone oils. Said silicone composition is usually a liquid or paste at room temperature. When less than 5 wt % of the silicone composition is blended, the defoaming capacity is inadequate. On the other hand, when this quantity exceeds 50 wt %, the defoaming agent cannot be solidified. The blending quantity of the silicone composition is therefore 5 to 50 wt % and preferably 15 to 35 wt %, based on the combined quantities of components (a) through (c).

In addition to components (a) through (c), additives such as dyes, pigments and fragrances can be added to the solid defoaming agent of the present invention.

The silicone defoaming agent of the present invention may be produced by melting components (a) through (c) and mixing them in a mixer, followed by cooling and solidification. However, the preferred method is to melt component (a) at 70° to 100° C., add component (b), and mix this to give to a homogeneous liquid, which is then cooled to 55 to 65° C. Component (c) is added, followed by mixing to homogeneity, pouring into a mold and cooling. This procedure reliably produces a solid defoaming agent which does not bleed silicone oil. Solid defoaming agents with various shapes and sizes are produced by varying the shape and size of the mold.

EXAMPLES

The present invention will be explained by examples of execution. The viscosity in the examples was measured at 25° C. and "%" in Tables 1 through 3 is by weight (wt %).

EXAMPLE 1

Solid silicone defoaming agents were produced as follows from the nonionic surfactants and water-soluble polymers reported in Table 1 and a silicone composition composed of 94 wt % poly(dimethylsiloxane) oil with a viscosity of 900 cS and 6 wt % commercial wet-method silica. The nonionic surfactant, which is solid at room temperature, was melted at 70° to 100° C. and combined and mixed with the water-soluble polymer, which is also solid at room temperature, to give a liquid which was then cooled to 55° to 65° C. This was combined and mixed with the silicone composition to homogeneity and then poured into a mold to produce a cylindrical solid silicone defoaming agent (200 g). The produced solid silicone defoaming agent was inspected with the unaided eyes for silicone oil bleeding. The defoaming performance was examined by Test Method 1 below and the dissolution rate was measured by Test Method 2 below. The results of the evaluations are reported in Table 1.

TEST METHOD 1 (Defoaming Test)

100 ml of a 1 wt % aqueous solution of polyoxyethylene octylphenyl ether were placed in a 225 ml glass bottle and 0.01 g solid silicone defoaming agent was then added. The glass bottle was sealed and then shaken up-and-down 30 times at an amplitude of 30 cm over 10 seconds. The time required to the start of foam disappearance was then measured and this time period was designated as the first cycle defoaming time. The process of shaking the glass bottle up-and-down 30 times at an amplitude of 30 cm over 10 seconds and measuring the time required to the beginning of foam disappearance was repeated until this measured defoaming time was $\geq 30$ seconds. The number of process repetitions was designated as the persistence value.

TEST METHOD 2 (Test of Dissolution Rate)

Tapwater was poured into a 1 liter beaker. Cylindrical solid silicone defoaming agent (100 g; diameter, 60 mm; height, 35 mm) in a net bag was set in this so as to be submerged. Tapwater was then poured into the beaker at a rate of 1 liter/minute. The number of days required for the complete dissolution of the solid silicone defoaming agent was measured.

TABLE 1

| Composition | The Present Invention Sample No. | | | | | Comparison Examples Sample No. | | | | | |
|---|---|---|---|---|---|---|---|---|---|---|---|
| | A | B | C | D | E | F | G | H | I | J | K |
| COMPONENTS | | | | | | | | | | | |
| *Nonionic Surfactants (a)* | | | | | | | | | | | |
| glycerol monostearate | 30% | 30% | 30% | 35% | | 25% | 25% | 25% | 35% | 30% | 40% |
| propylene glycol monostearate | 20% | 20% | 20% | 25% | 50% | 25% | 25% | | 25% | 20% | 27% |
| polyoxyethylene monostearate | | | | | | | | 50% | | | |
| *Water-Soluble Polymers (b)* | | | | | | | | | | | |
| carboxyvinyl polymer | | 10% | 20% | 10% | 15% | 10% | | | | | 15% |
| poly(vinyl alcohol) | 20% | 10% | | 10% | 15% | | | | | | 15% |
| sodium salt of carboxymethyl-cellulose | | | | | | 10% | 20% | | | | |
| methyl Cellosolve | | | | | | | | | 5% | 20% | |
| poly(ethylene oxide) | | | | | | | | | | | 20% |
| Silicone composition (c) | 30% | 30% | 30% | 20% | 20% | 30% | 30% | 20% | 20% | 30% | 3% |
| RESULTS OF EVALUATION | | | | | | | | | | | |
| *Defoaming Performance* | | | | | | | | | | | |
| silicone oil bleeding | no | no | no | no | no | yes | yes | yes | yes | yes | no |
| first cycle defoaming time (sec) | 7 | 5 | 5 | 5 | 6 | — | — | — | — | — | >30 |
| persistence value (cycles) | 14 | 15 | 15 | 15 | 13 | — | — | — | — | — | 0 |
| Days to Complete Dissolution (days) | >30 | 10 | 5 | 10 | 7 | — | — | — | — | — | 10 |

— measurement suspended due to a large quantity of silicone oil liberation

EXAMPLE 2

Solid silicone defoaming agent was produced as described in Example 1. In the instant case, however, the nonionic surfactant, which is solid at room temperature, and the water-soluble polymer, which is solid at room temperature, are reported in Table 2. Silicone composition (c), composed of 6 wt % commercial wet-method silica and 94 wt % poly(dimethylsiloxane) oil with a viscosity of 50 or 900 cS or 94 wt % poly(dimethylsiloxane) gum, was employed at 30 wt %. The results for the evaluation of the defoaming performance and other properties are reported in Table 2.

EXAMPLE 3

A solid silicone defoaming agent was produced as described in Example 1. In the instant case, however, the nonionic surfactant and water-soluble polymer was the substances described for sample B in Table 1 of Example 1. Also, in place of the above-mentioned silicone composition, 30 wt % was used of a silicone composition which was composed of 6 wt % commercial wet-method silica and a dimethylsiloxane-methylphenylsiloxane copolymer oil with a viscosity of 1000 cS or a poly(methylphenylsiloxane) oil with a viscosity of 500 cS or a dimethylsiloxane-methyltetradecylsiloxane-methyl(2-phenylethyl)siloxane copolymer oil with a viscosity of 1200 cS. The results for the evaluation of the defoaming performance and other properties are reported in Table 3.

TABLE 2

| Composition | The Present Invention Sample No. | Comparison Examples Sample No. | |
|---|---|---|---|
| | L | M | N |
| COMPONENTS | | | |
| *Nonionic Surfactants (a)* | | | |
| glycerol dioleate | 20% | 20% | 20% |
| propylene glycol monooleate | 20% | 20% | 20% |
| *Water-Soluble Polymers (b)* | | | |
| carboxyvinyl polymer | 15% | 15% | 15% |
| polyvinyl alcohol | 15% | 15% | 15% |
| Silicone composition (c) | 30% | 30% | 30% |
| (silicone used) | poly(dimethylsiloxane) oil with 900 cS viscosity | poly(dimethylsiloxane) oil with 50 cS viscosity | poly(dimethylsiloxane) gum |
| RESULTS OF EVALUATION | | | |
| Silicone Oil Liberation | no | no | yes |
| *Defoaming Performance* | | | |
| first cycle defoaming time (sec) | 8 | 18 | — |
| persistence value (cycles) | 15 | 1 | — |
| Days to Complete Dissolution (days) | 10 | 9 | — |

— measurement suspended due to a large quantity of silicone oil liberation

TABLE 3

| | Sample No. | | |
|---|---|---|---|
| | O | P | Q |
| Type of Silicone Oil in the Silicone composition | dimethylsiloxane methylphenylsiloxane copolymer | poly(methyl-phenylsiloxane) | dimethylsiloxane-methyltetradecyl-siloxanemethyl (2-phenylethyl)-siloxane copolymer |
| RESULTS OF EVALUATION | | | |
| Silicone Oil Liberation | no | no | no |
| Defoaming Performance | | | |
| first cycle defoaming time (sec) | 10 | 12 | 12 |
| persistence value (cycles) | 10 | 9 | 11 |
| Days to Complete Dissolution (days) | 11 | 12 | 10 |

We claim:

1. A solid silicone defoaming composition consisting essentially of:
   (a) 20 to 80 weight % nonionic surfactant selected from the group consisting of glycerol aliphatic acid esters which are solid at room temperature and propylene glycol aliphatic acid esters which are solid at room temperature;
   (b) 5 to 50 weight % water-soluble polymer compound selected from the group consisting of carboxyvinyl polymers which are solid at room temperature and a poly(vinyl alcohol) which is solid at room temperature; and
   (c) 5 to 50 weight % silicone composition composed of 1 to 20 weight % fine powdery silica and 99 to 80 weight % silicone oil having a viscosity of at least 100 cS at 25° C.

2. The composition of claim 1, wherein said nonionic surfactant is selected from the group consisting of glyceryl monostearate, glyceryl monooleate, glyceryl monomyristate, glyceryl distearate, glyceryl diooleate, propylene glycol monopalmitate, propylene glycol monostearate, propylene glycol monooleate and propylene glycol monomyristrate.

3. The composition of claim 2, wherein said powdery silica is selected from the group consisting of precipitated silica, fumed silica and silica aerogel.

4. The composition of claim 3, wherein said silicone oil is selected from the group consisting of poly(dimethylsiloxane), poly(methylphenylsiloxane), dimethylsiloxane-methylphenylsiloxane copolymer and dimethylsiloxane-methyltetradecylsiloxane-methyl (2-phenylethyl)siloxane copolymer.

5. The composition of claim 4, wherein said water-soluble polymer is selected from the group consisting of poly(methacrylic acid), acrylic acid-methacrylic acid copolymers, copolymers of acrylic acid with ethylene, copolymers of acrylic acid with vinyl alcohol and poly(vinyl alcohol).

6. The composition of claim 5, wherein said nonionic surfactant content is 35 to 65% by weight, said water-soluble polymer content, is 15 to 35% by weight and said silicone composition content is 15 to 35% by weight.

7. The composition of claim 6, wherein said nonionic surfactant is a combination of glycerol monostearate and propylene glycol monostearate; and said silicone composition is a combination of about 6% by weight of a wet process silica and about 94% by weight of a poly(-dimethylsiloxane) having a viscosity of 100 to 900 cS at 25° C.

8. The composition of claim 6, wherein said nonionic surfactant is a combination of glycerol dioleate and propylene glycol monooleate; and said silicone composition is a combination of about 6% by weight of a wet process silica and about 94% by weight of a poly(dimethylsiloxane) having a viscosity of 100 to 900 cS at 25° C.

9. The composition of claim 7, wherein said glycerol monostearate content is about 30% by weight, said propylene glycol monostearate content is about 20% by weight and said silicone composition content is about 30% by weight.

* * * * *